United States Patent

Bannai et al.

[11] Patent Number: 5,933,571
[45] Date of Patent: Aug. 3, 1999

[54] VIDEO IMAGE CODING AND RECORDING APPARATUS AND VIDEO IMAGE CODING, RECORDING AND REPRODUCING APPARATUS

[75] Inventors: Tatsushi Bannai, Sakai; Mitsuhiro Miyashita, Nishinomiya, both of Japan

[73] Assignee: Matsushita Electric Industrial Co., Ltd., Osaka, Japan

[21] Appl. No.: 08/426,248

[22] Filed: Apr. 21, 1995

[30] Foreign Application Priority Data

Apr. 28, 1994 [JP] Japan .................................. 6-091393

[51] Int. Cl.⁶ .............................. H04N 5/917; H04N 7/26
[52] U.S. Cl. ........................................... 386/109; 386/112
[58] Field of Search .................................. 358/335, 342, 358/310, 312; 360/32, 33.1, 10.3, 10.1; 348/384; 386/46, 109, 111, 112, 73, 27; H04N 5/917, 7/26

[56] References Cited

U.S. PATENT DOCUMENTS

| 5,175,631 | 12/1992 | Juri et al. ................................ 358/335 |
| 5,282,049 | 1/1994 | Hatakenaka et al. .................... 358/335 |
| 5,335,117 | 8/1994 | Park et al. ................................ 360/48 |
| 5,341,250 | 8/1994 | Uchida et al. ............................ 360/48 |

FOREIGN PATENT DOCUMENTS

| A564269 | 10/1993 | European Pat. Off. . |
| 5-304661 | 11/1993 | Japan . |

OTHER PUBLICATIONS

NHK Laboratories Note, No. 424, Mar. 1994 Tokyo, JP, pp. 29–44, "Error Correction, Concealment and Shuffling".

*Primary Examiner*—Robert Chevalier
*Attorney, Agent, or Firm*—Wenderoth, Lind & Ponack, L.L.P.

[57] ABSTRACT

Coefficient data in two coding blocks which overlap on a video screen are recorded in distant regions on a recording medium, the distant regions not being directly adjacent to one another. Error detected coefficient data during reproduction are corrected with reference to the feature that the overlapped pixels between the two coding blocks are equal.

48 Claims, 12 Drawing Sheets

FIG. 4

PIXEL DATA OF CODING BLOCK A →

PIXEL DATA OF CODING BLOCK B →

| a00 | a01 | a02 | a03 | b00 | b01 | b02 | b03 |
|-----|-----|-----|-----|-----|-----|-----|-----|
| a10 | a11 | a12 | a13 | b10 | b11 | b12 | b13 |
| a20 | a21 | a22 | a23 | b20 | b21 | b22 | b23 |
| a30 | a31 | a32 | a33 | b30 | b31 | b32 | b33 |

DC LOW PASS → HIGH PASS

LOW PASS ↓ HIGH PASS

| A00 | A01 | A02 | A03 | B00 | B01 | B02 | B03 |
|-----|-----|-----|-----|-----|-----|-----|-----|
| A10 | A11 | A12 | A13 | B10 | B11 | B12 | B13 |
| A20 | A21 | A22 | A23 | B20 | B21 | B22 | B23 |
| A30 | A31 | A32 | A33 | B30 | B31 | B32 | B33 |

COEFFICIENT DATA OF CODING BLOCK A

COEFFICIENT DATA OF CODING BLOCK B

VIDEO IMAGE CODING AND RECORDING APPARATUS AND VIDEO IMAGE CODING, RECORDING AND REPRODUCING APPARATUS

BACKGROUND OF THE INVENTION

1. Field of the Invention

The present invention relates to a video image coding and recording apparatus and a video image coding, recording and reproducing apparatus used for compression encoding a video signal to a coded bit stream, and also to a method of arranging the compression codes on a recording medium, and further to an error correction of reproduced signals.

2. Description of Prior Art

In recent years, with a development of a digital signal processing technique, various digital apparatuses have been developed. Recently, there has been proposed to develop a more compact size digital video recorder by recording digital video signals by compression encoding. As a method for compression encoding digital video signals, recently it has become popular to adopt a discrete cosine transformation (DCT) which is one of frequency conversion of the digital video signals into coding blocks such as JPEG (Joint Photographic Coding Experts Group) or MPEG (Moving Picture Coding Experts Group). According to the method, a digital video signal is divided into the coding blocks, the coding blocks are discrete cosine transformed to obtain coefficient data, and the coefficient data are compressed by variable length coding.

However, in a video image coding, recording and reproducing apparatus using the method as described above, when an error occurs in the data according to the recording and reproducing, it becomes impossible to decode variable length codes at and after an error occurring point. Further, even if a discontinued point of the variable length codes is detected and variable length decodes are refreshed by a refreshing code or the like, the variable length codes cannot be decoded for a section from the error occurring point to a refreshment point.

In a case as above, video images show a lack of several coding blocks on a video screen and this extends over several video screens. This has been a large problem in the compression encoding for the video image coding, recording and reproducing apparatus.

SUMMARY OF THE INVENTION:

An object of the present invention is to provide a video image coding and recording apparatus in which, in recording and reproducing by compression coding the digital video signals, no lack occurs in several coding blocks on the video screen even if an error occurs, and to provide a video image coding, recording and reproducing apparatus in which error corrects the coefficient data lost by occurrence of the error on recording or reproducing.

In order to attain the above object, the present invention provides a video image coding and recording apparatus comprising:

means for dividing a digital video signal into a plurality of coding blocks each containing a plurality of pixel data;

means for orthogonally transforming the digital video signal in each of the coding blocks into coefficient data to form new block each having one of the coefficient data; and means for recording the new blocks in distant regions on a recording medium so that each of the distant region is not adjacent to each other.

Further, the present invention provides a video image coding, recording and reproducing apparatus comprising:

means for dividing a digital video signal into a plurality of coding blocks each containing a plurality of pixel data, the coding block comprising a first coding data and a second coding data;

means for orthogonally transforming the digital video signal in each of the coding blocks into coefficient data to form new block each having one of the coefficient data, the coefficient data comprising a first coefficient data which is in the first coding block and has an error and a second coefficient data which is in the second coding block and has no error;

means for recording the new blocks in distant regions on a recording medium so that each of the distant region is not adjacent to each other;

means for reproducing the new block from the recording medium;

means for detecting whether or not the coefficient data have the error;

means for correcting the first coefficient data by using the second coefficient data to obtain error corrected coefficient data; and means for orthogonally transforming the error corrected coefficient data to obtain a reproduced digital video signal.

By constitutions as above, in a case that the error occur, prevention can be made from a loss of all the coefficient data in the coding block and a lack of several coding blocks during reproducing. Furthermore, by error correcting by using the coefficient data of the adjacent coding blocks having high pixel correlations, stability of a reproduced video image can be improved.

BRIEF DESCRIPTION OF THE DRAWINGS

FIG. 4 shows a conceptual diagram showing coefficient data of coding blocks.

DESCRIPTION OF PREFERRED EMBODIMENTS

Figure 1:
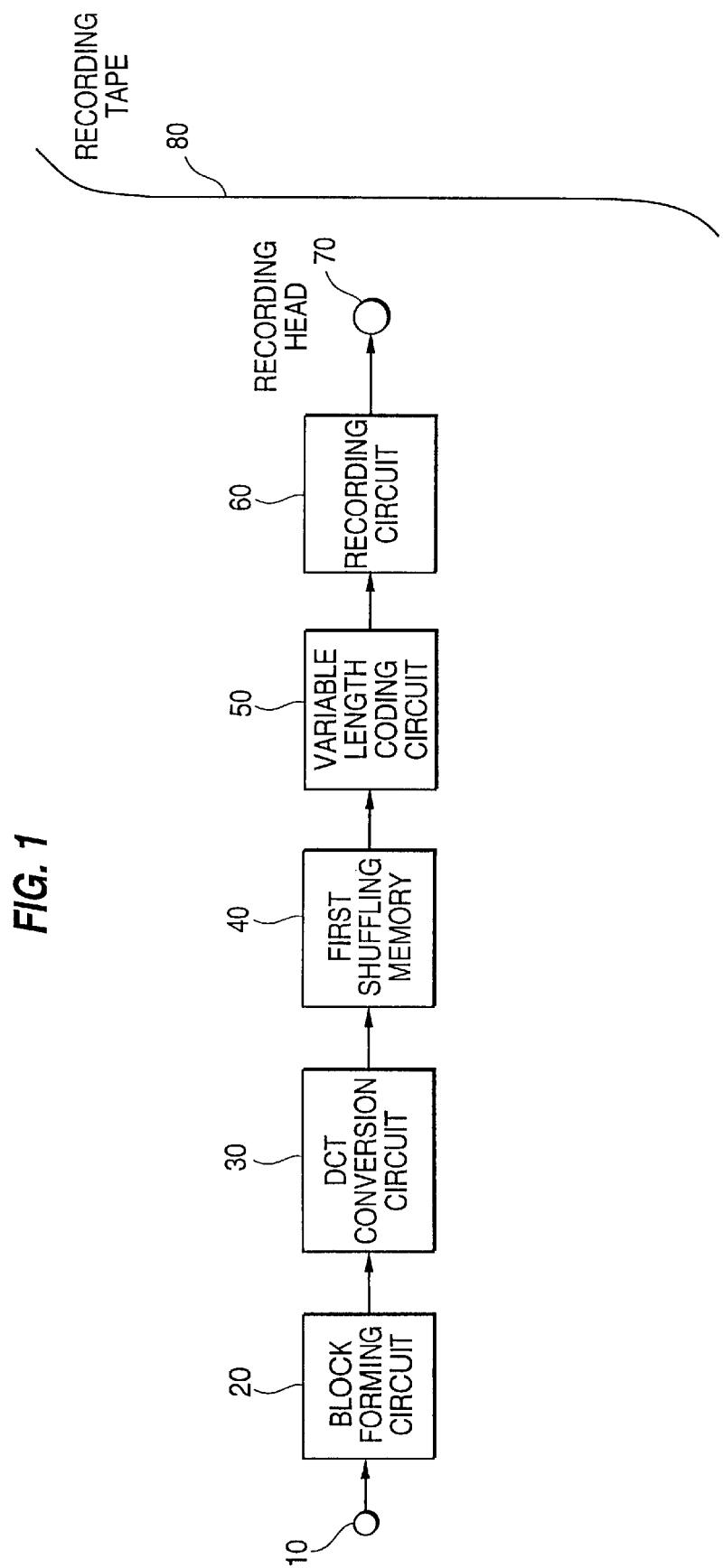
FIG. 1 shows a block diagram of a video image coding and recording apparatus in a first embodiment of the present invention.

Hereinafter, a first embodiment of the present invention will be explained with reference to the drawings. FIG. 1 shows a block diagram of a video image coding and recording apparatus of the first embodiment.

In FIG. 1, reference numeral 10 denotes an input terminal of a digital video signal, reference numeral 20 denotes a block forming circuit, reference numeral 30 denotes a DCT conversion circuit, reference numeral 40 denotes a first shuffling memory, reference numeral 50 denotes a variable length coding circuit, reference numeral 60 denotes a recording circuit, reference numeral 70 denotes a recording head, and reference numeral 80 denotes a recording tape.

With respect to the video image coding and recording apparatus constituted as above, an operation of the video image coding and recording apparatus is explained below.

To the input terminal 10, a digital video signal is supplied, and is divided into 4×4 coding blocks in the block forming circuit 20. An output of the block forming circuit 20 is frequency converted in each of the coding blocks by the DCT conversion circuit 30, and is stored as the coefficient data in the first shuffling memory 40. The variable length coding circuit 50 variable length codes the coefficient data outputted from the first shuffling memory 40 according to a predetermined shuffling rule.

Figure 2:
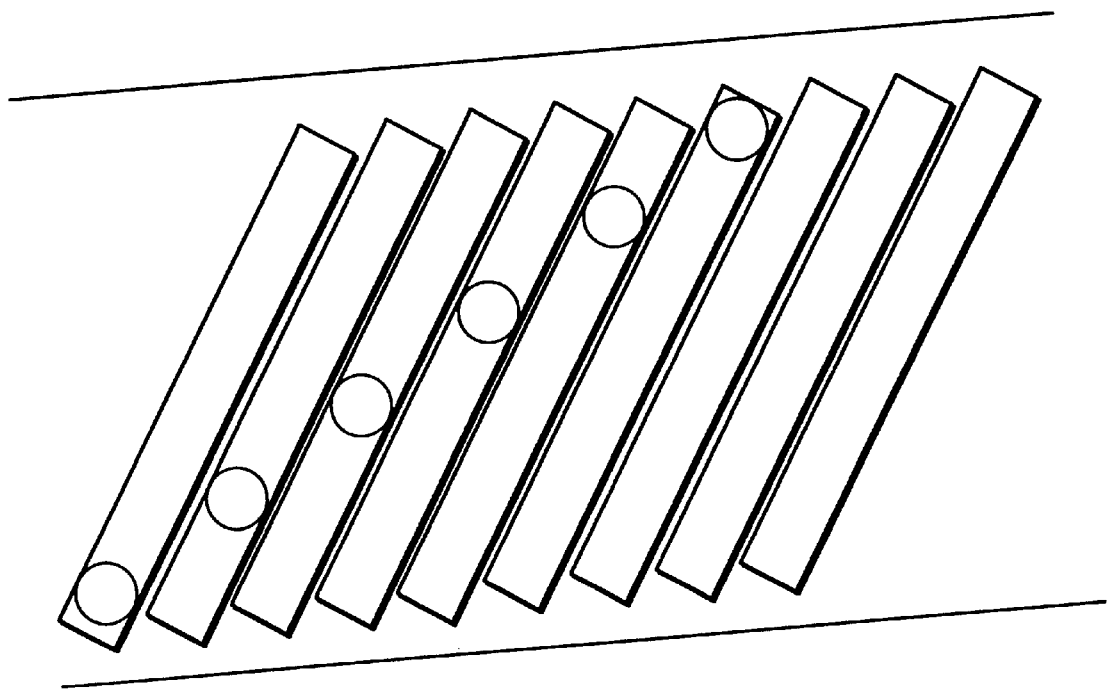
FIG. 2 shows a conceptual diagram showing regions on a recording tape.

The predetermined shuffling rule is to allow at least that the coefficient data in a same coding block are present by mixture with the coefficient data in other coding blocks, and that the coefficient data in adjacent coding blocks on a video screen, or, the coefficient data in a coding, block constituting a same region on the video screen and belonging to different fields may be recorded in distant regions on the recording tape 80 as in circle marks shown in FIG. 2 by shuffling the coefficient data.

The coefficient data which has been variable length coding after shuffling as above are added to an error correcting code and subjected to channel coding in the recording circuit 60, and are supplied to the recording head 70 through a recording amplifier. The recording head 70 records the coefficient data on the recording tape 80.

Figure 10A:
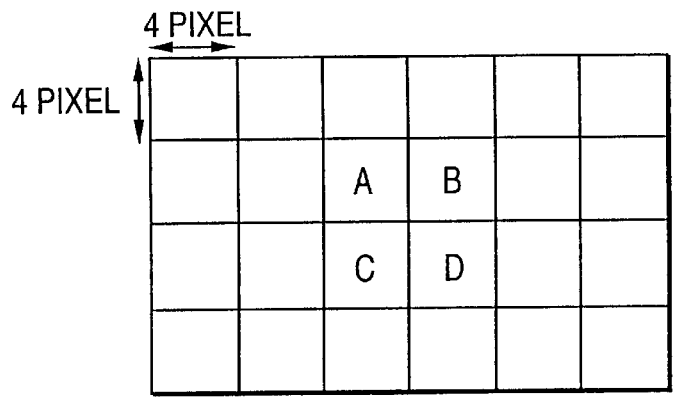
FIG. 10 shows a third conceptual diagram showing divided groups of the coding blocks.
Figure 10B:
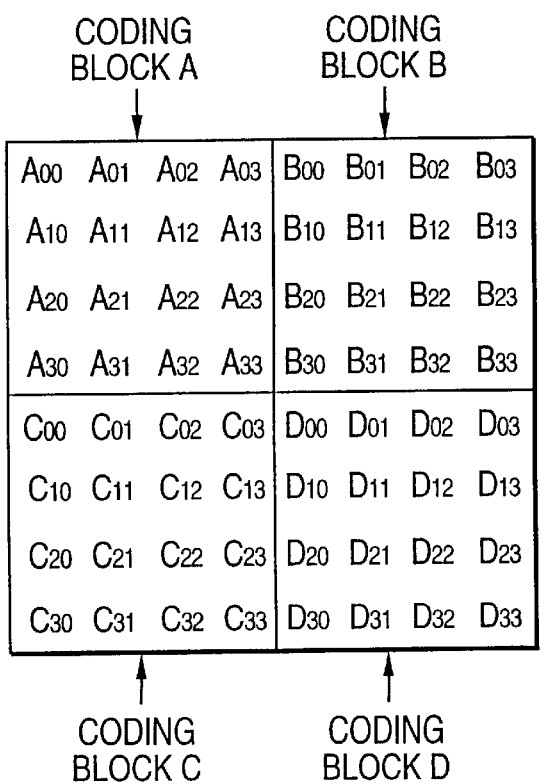
Figure 10C:
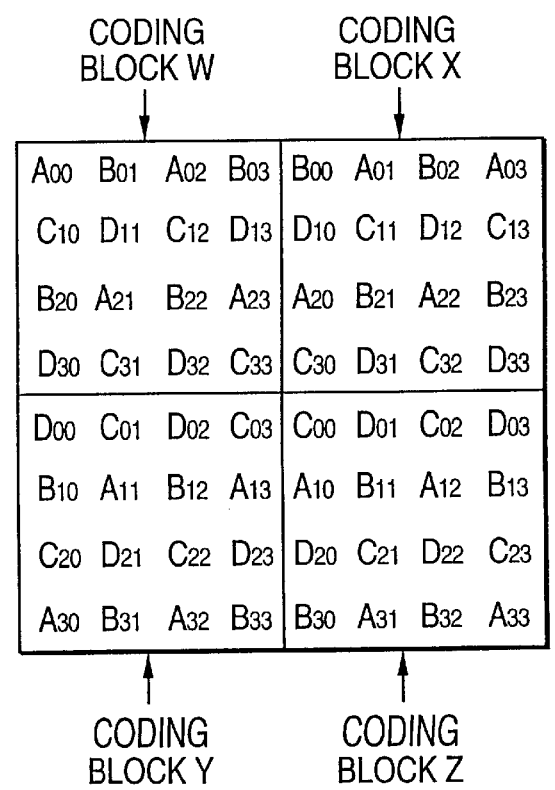
Figure 11A:
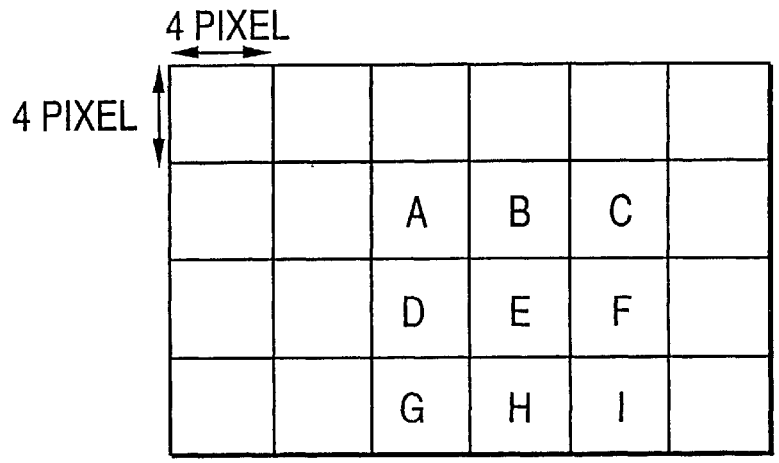
FIG. 11 shows another conceptual diagram showing divided groups of the coding blocks.
Figure 11B:
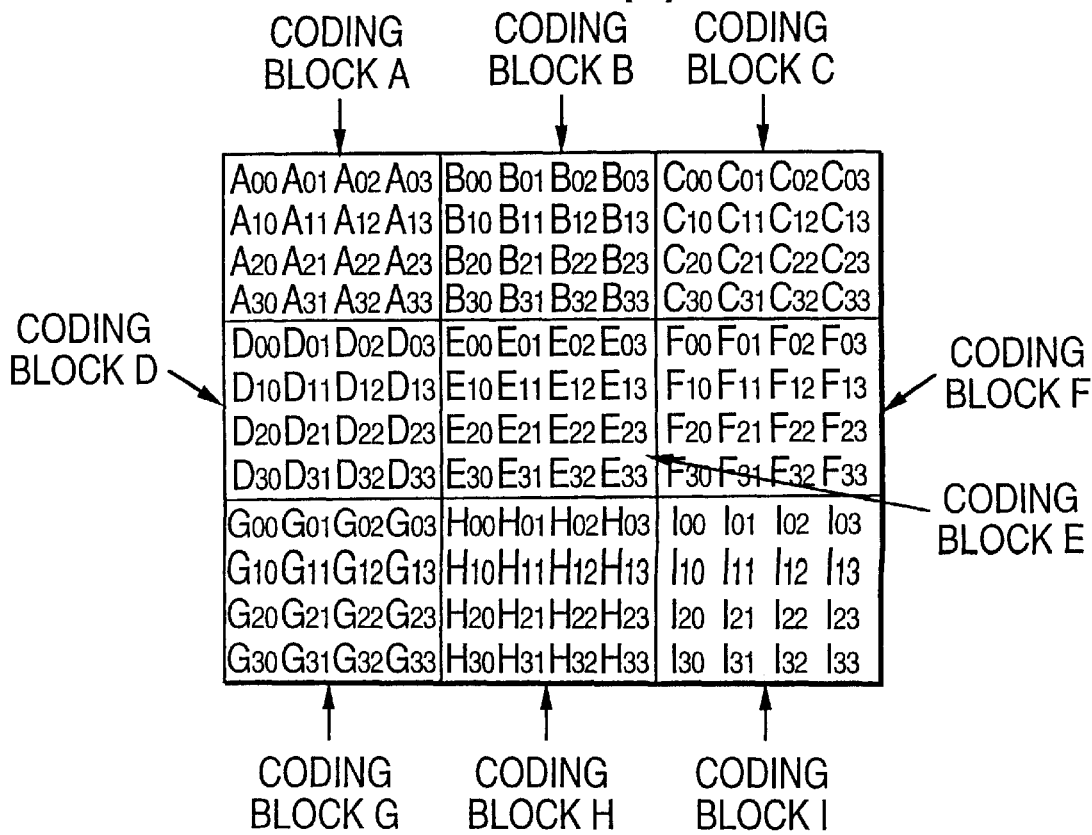
Figure 11C:
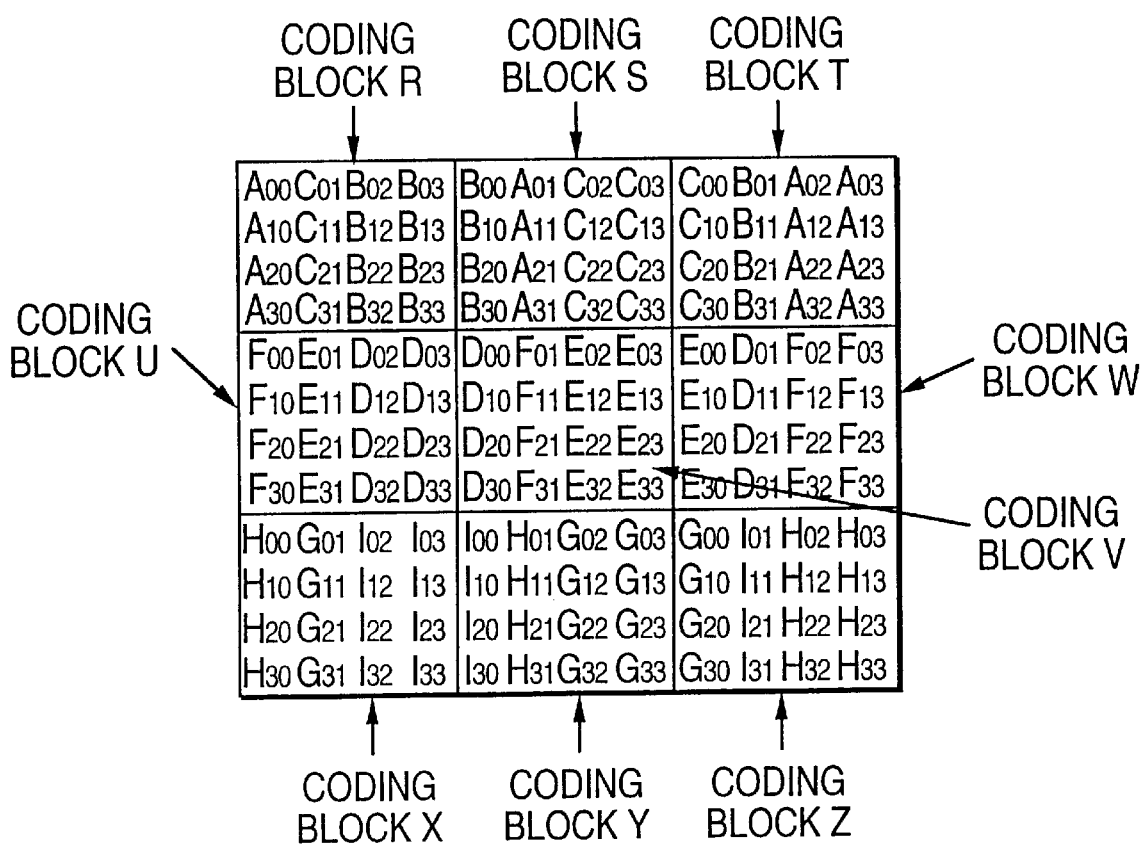
Figure 11D:
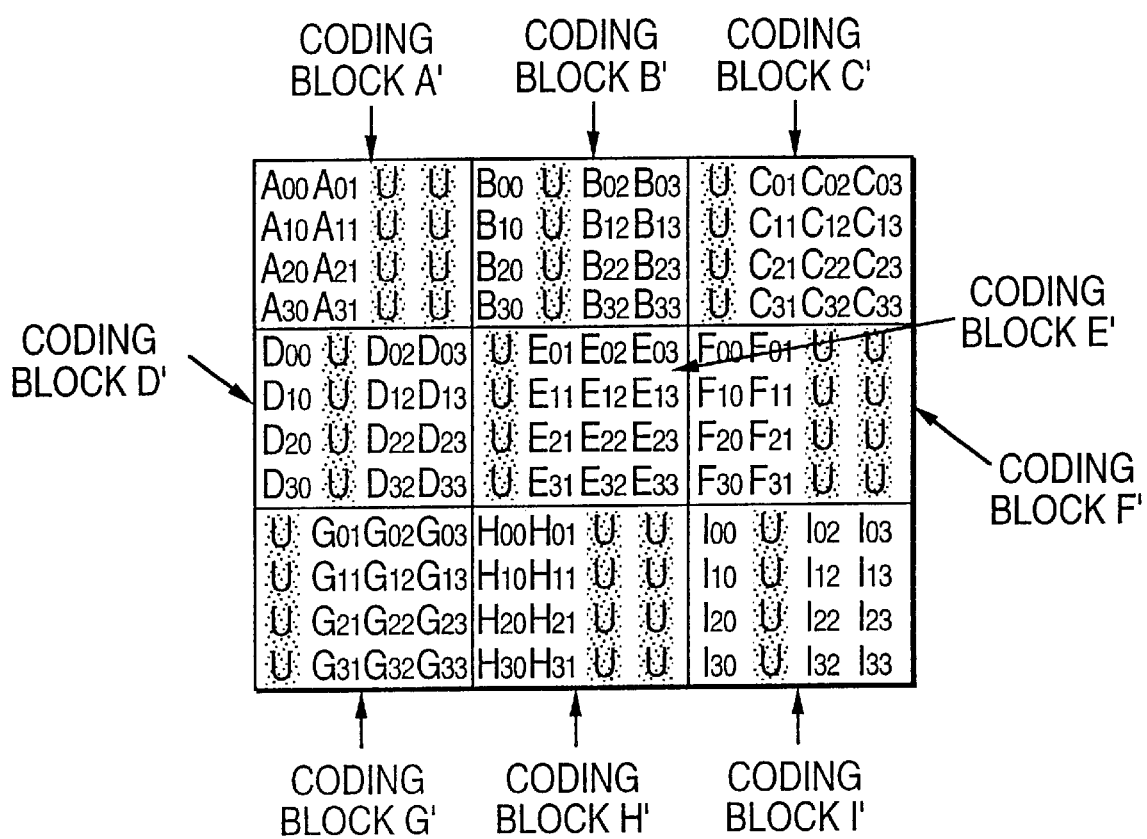

The shuffling as above is explained by using a third conceptual diagram as shown in FIG. 10. In FIG. 10, (a) shows the four coding blocks A, B, C and D which are adjacent to one another in horizontal and vertical directions on the video screen. In FIG. 10, (b) shows the 16 coefficient data representing outputs of the DCT conversion circuit 30, or outputs of the four coding blocks A, B, C and D in alphabetical capital letters. In FIG. 10, (c) shows that the coefficient data from the four coding blocks A, B, C and D are present by mixture to constitute the new coding blocks W, X, Y and Z. The new coding blocks w, X, Y an d Z are respectively variable length coded, and variable length codes respectively corresponding to the new coding blocks are recorded in the distant regions on the recording tape.

As described above, according to the first embodiment, by recording the coefficient data in the coding block in the distant regions on the recording tape, even in a case that an error occurs during recording or reproducing, the coefficient data which become impossible to be decoded by the error are present in a specific coding block, in adjacent regions on the video screen, or in the different fields, and are not concentrated on the same region on the video screen. Accordingly, it is possible to solve the significant problems such as lack of specific regions of an image on a reproduced screen, or the continuous periodical lack of images in the same region.

In case of a use of a one dimension Huffman coding or the like which gives one variable length code in each of the coefficient data, it is apparent that the coding efficiency does not deteriorate even when the shuffling of the coefficient data is carried out as explained above.

Further, in case of using a two dimension Huffman coding or the like which variable length codes by combining a number of the coefficient data of continual zeros with an amplitude of the coefficient data of succeeding non-zeros, it is effective to variable length code by reading out the coefficient data corresponding to a low band conversion degree in the coding block from the first shuffling memory 40 by shuffling as described above, and by continuously reading out the coefficient data corresponding to a high band conversion degree which has good possibility for the continual zeros in the coding block.

In view of a constitution as described above, degradation of coding efficiency can be prevented. In this case, when an error has occurred during the recording or reproducing, there is a possibility for all the coefficient data corresponding to the high band conversion degree to be lost in the coding block. However, since the coefficient data corresponding to the high band conversion degree have small energy and the visual sensitivity to the coefficient data is low, no large deterioration of quality of the image should result.

Figure 3:
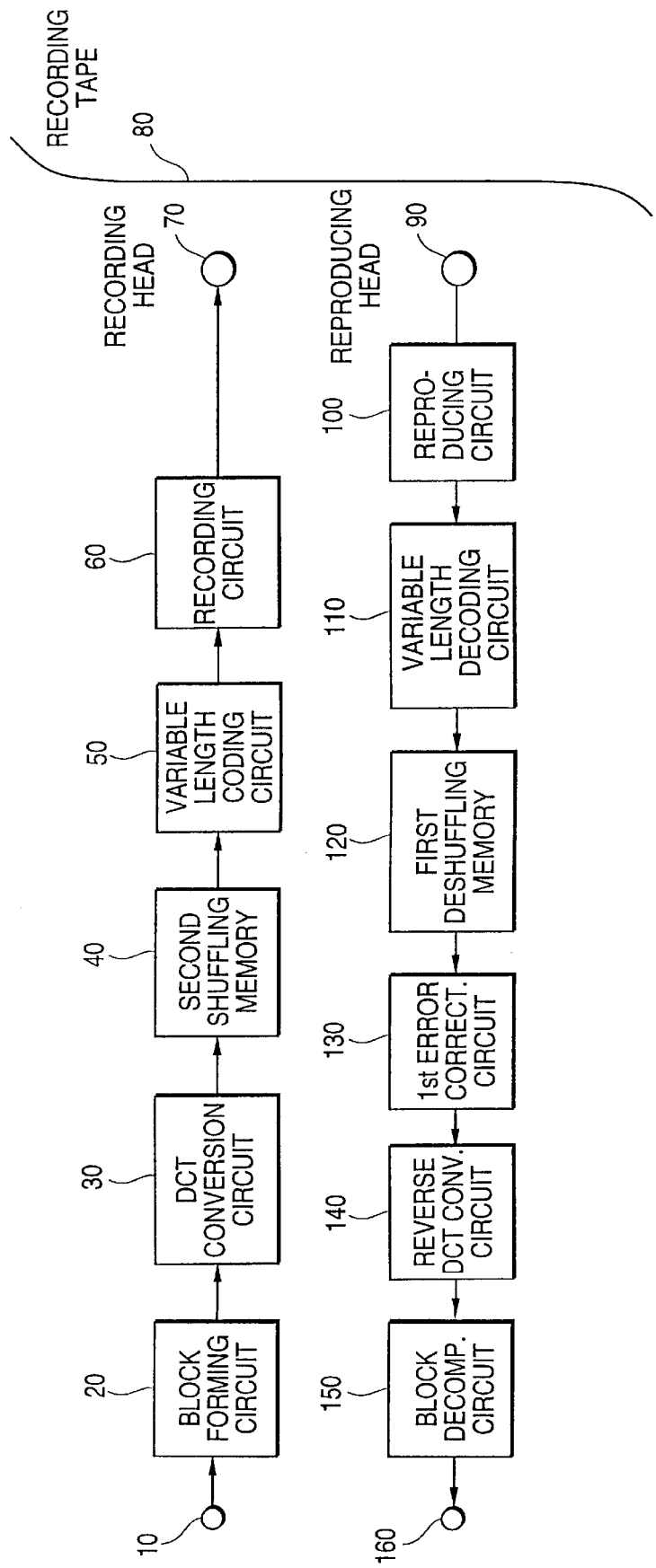
FIG. 3 shows a block diagram of a video image coding, recording and reproducing apparatus in a second embodiment of the present invention.

Next, a second embodiment of the present invention will be described with reference to the drawings. FIG. 3 shows a block diagram of a video image coding, recording and reproducing apparatus according to the second embodiment. With respect to the same elements as those of the first embodiment, same reference numerals as used in the first embodiment are assigned and detailed explanation. is omitted.

In FIG. 3, reference numeral 42 denotes a second shuffling memory, reference numeral 90 denotes a reproducing head, reference numeral 100 denotes a reproducing circuit, reference numeral 110 denotes a variable length decoding circuit, reference numeral 120 denotes a first deshuffling memory, reference numeral 131) denotes a first error correction circuit, reference numeral 140 denotes an inverse DCT conversion circuit, reference numeral 150 denotes a block decomposition circuit, and reference numeral 160 denotes an output terminal of the digital video signal.

With respect to the video image coding, recording and reproducing apparatus constituted as above, an operation thereof is explained below.

While a circuit constitution in recording of the second embodiment is almost the same as that of the first embodiment shown in FIG. 1, a difference therebetween is a shuffling rule in the shuffling memory allowing that the coefficient data in a same conversion degree in the adjacent coding blocks on the video screen or the coefficient data in the same conversion degree of the coding block belonging to the different fields and constituting the same region on the video screen are to be recorded in the distant regions on the recording tape 80.

The shuffling as above is explained with another conceptual diagram shown in FIG. 11. In FIG. 11, (a) shows nine coding blocks A, B, C, D, E, F, G, H and I which are adjacent in the horizontal and vertical directions on the video screen. In FIG. 11, (b) shows the outputs of the DCT conversion circuit 30, or outputs of the nine coding blocks in 16 coefficient data shown in alphabetical capital letters. In FIG. 11, (c) shows that the coefficient data from the nine coding blocks are present by mixture to constitute the new coding blocks R, S, T, U, V, W, X, Y and Z. The new coding blocks R, S, T, U, V, W, X, Y and Z are respectively variable length coding, and the variable length codes respectively corresponding to the new coding blocks are recorded in the distant regions on the recording tape.

Next, a reproducing operation for reproducing the coefficient data recorded by a recording operation as above is explained.

The reproducing head 90 supplies a reproducing output from the recording tape 80 to the reproduction circuit 100. The reproduction circuit 100 demodulates and error corrects the reproducing output, and supplies reproduced variable length coded coefficient data and an error correcting error flag showing a result of the error correcting the reproducing output to the variable length decoding circuit 110. The variable length decoding circuit 110 variable length decodes the reproduced variable length coded coefficient data, and outputs, along with the coefficient data, a decoding error flag showing whether the reproduced variable length coded coefficient data are variable length decoded correctly or not, to the first deshuffling memory 120.

A generation of the decoding error flag is carried out by such steps as to output the decoding error flag to the coefficient data to be decoded in a section from an error generation point shown by the error correction error flag to refreshing a variable length decode by a refreshing code or the like, or to output the decoding error flag in a case that a predetermined number of the coefficient data is not carried out in the section in which the predetermined number of the coefficient data should be decoded.

The first error correction circuit 130 reads out the coefficient data in the coding blocks which constitute the same region on the video screen and the decoding error flag corresponding to each of the reproduced variable length coded coefficient data from the first deshuffling memory 120, and corrects the reproduced variable length coded coefficient data on which an error has been detected.

The correction of the reproduced variable length coded coefficient data is explained below. When recording, the coefficient data in the same conversion degree in the adjacent coding blocks on the video screen or the coefficient data in the same conversion degree of the coding block belonging to the different fields and constituting the same region on the video screen are recorded in the distant regions on the recording tape 80. Accordingly, the coefficient data which are in the same conversion degree as error detected coefficient data in the coding block on the video screen adjacent to the coding block which includes the error-detected coefficient data are correctly reproduced, so that the error detected coefficient data can be corrected as an average value of error-free coefficient data on the same conversion degree.

For example, explanation is given on the case where the coding blocks T, W and Z have errors in FIG. 11. Outputs of the first deshuffling memory 120 are shown in (d) of FIG. 11 in coding blocks A', B', C', D', E', F', G', H' and I'. The coefficient data counted as errors and lost. are shown as U. In the coding block E', the coefficient data E00, E10, E20, and E30 are lost, but the coefficient: data in the same conversion degree are correctly reproduced in the adjacent coding blocks (coding blocks B', D', F' and H'). Therefore, by obtaining an average value of B00, D00, F00 and H00, and substituting the average value into E00, it becomes possible to make an error correction.

In general, as the coding blocks situated spatially in the vicinity have high correlations, there are correlations in the coefficient data in the adjacent coding blocks. Therefore, by adjusting errors by the average value of the error-free coefficient data of the adjacent coding block, reproduced images that give no visual obstacle can be obtained.

Further, the coefficient data in the same conversion degree in the coding block constituting the same region on the video screen as the coding block including the coefficient data in which an error has been detected and belonging to the different field is also correctly reproduced. Therefore, the coefficient data in which the error has been detected can be replaced by the error-free coefficient data in the same conversion degree as described above and corrected. In the video signal, the time-based correlations in the same region on the video screen are high. Accordingly, by error correcting by replacing the coefficient data in which the error has been detected by the error-free coefficient data of one field preceding order, visually obstacle-free reproduced images can be obtained.

Further, the error correction can be carried out adaptively in the adjacent coding blocks or between the fields.

The coefficient data in which the error corrections as explained above have been made are converted to the pixel data by the inverse DCT conversion circuit 140 and supplied to the block decomposing circuit 150. The block decomposing circuit 150 converts the pixel data divided into the coding blocks to the digital video signals, and outputs to the output terminal 160.

As described above, according to the second embodiment, when recording, the coefficient data in the same conversion degree in the adjacent coding blocks on the video screen or the coefficient data in the same conversion degree in the coding block constituting the same region con the video screen and belonging to the different fields are recorded in the distant regions on recording medium, and when reproducing, the average value of the plural coefficient data in the same conversion degree as the error detected coefficient data in the coding block on the video screen adjacent to the coding block including the error-detected coefficient data or the coefficient data in the same conversion degree in the coding block constituting the same region on the video screen as the coding block including the coefficient data in which an error has been detected and belonging to the different field replace the coefficient data which the error is detected and correct the error. By this constitution, if the error occurs, it does not occur for the coefficient data on the same conversion degree in the adjacent coding blocks or between the continual coding blocks in the different fields to be lost simultaneously, and there is less possibility for simultaneous loss of the plural coefficient data in the same coding block. Accordingly, it is possible to error correct only the coefficient data in which the error is detected in the coding block with the adjacent coding blocks or with the different fields by utilizing the correlation of the coefficient data of the same conversion degree in the coding block of the same region, so that the reproduced images free of visual obstacle can be obtained.

Next, a third embodiment of the present invention will be described. The constitution of the video image coding, recording and reproducing apparatus of the third embodiment is the same as the constitution of the video image coding, recording and reproducing apparatus of the second embodiment shown in FIG. 3. But an error correcting method is different. A following description refers to the error correcting method only. The error correcting method of the third embodiment is to correct an error by using pixel correlation at a boundary of the adjacent coding blocks on the video screen. Hereinafter, description is made on the error correcting method using the pixel correlation.

In general, the correlation between the adjacent pixels on the video screen is large, and the pixel correlation at the boundary between the adjacent coding blocks is also large. However, in case that the coefficient data in the coding block has been lost by error, if the lost coefficient data is taken as zero and the coding block is decoded to the pixel data, then the pixels at the boundary between the adjacent coding blocks have smaller correlations. Such a change in the pixel correlations is caused by the fact that the coefficient data to be originally reproduced has become impossible to be reproduced by the error, and the coefficient data has been replaced by zeros.

In FIG. 4, in two coding blocks adjacent to each other in horizontal direction (coding block A and coding block B), when a coefficient data A11 in the coding block A has been lost and remaining coefficient data in the coding block A and coefficient data in the coding block B are reproduced correctly, the coefficient data A11 can be subjected to error correction by using the following expression:

$$A_{11}=1/d_{13}((B_{10}B_{12}B_{13})d_0-(A_{10}O\,A_{12}A_{13})d_3) \quad (1)$$

Hereinafter, explanation is given on the derivation of the expression (1). A relative equation between a pixel data aij of the coding block A and the coefficient data Aij obtained by DCT conversion thereof is given by the following expression:

$$\begin{pmatrix} a_{00} & a_{01} & a_{02} & a_{03} \\ a_{10} & a_{11} & a_{12} & a_{13} \\ a_{20} & a_{21} & a_{22} & a_{23} \\ a_{30} & a_{31} & a_{32} & a_{33} \end{pmatrix} = D^T \begin{pmatrix} A_{00} & A_{01} & A_{02} & A_{03} \\ A_{10} & A_{11} & A_{12} & A_{13} \\ A_{20} & A_{21} & A_{22} & A_{23} \\ A_{30} & A_{31} & A_{32} & A_{33} \end{pmatrix} D \quad (2)$$

Similarly, the relative expression between the pixel data bij of the coding block B and the coefficient data Bij obtained by DCT conversion thereof is given by the following expression:

$$\begin{pmatrix} b_{00} & b_{01} & b_{02} & b_{03} \\ b_{10} & b_{11} & b_{12} & b_{13} \\ b_{20} & b_{21} & b_{22} & b_{23} \\ b_{30} & b_{31} & b_{32} & b_{33} \end{pmatrix} = D^T \begin{pmatrix} B_{00} & B_{01} & B_{02} & B_{03} \\ B_{10} & B_{11} & B_{12} & B_{13} \\ B_{20} & B_{21} & B_{22} & B_{23} \\ B_{30} & B_{31} & B_{32} & B_{33} \end{pmatrix} D \quad (3)$$

Here, aij, bij, Aij, and Bij are respectively elements of a matrix of 4×4.

D is a matrix representing the conversion basis of the DCT conversion of 4×4, as shown below:

$$D = \begin{pmatrix} d_{00} & d_{01} & d_{02} & d_{03} \\ d_{10} & d_{11} & d_{12} & d_{13} \\ d_{20} & d_{21} & d_{22} & d_{23} \\ d_{30} & d_{31} & d_{32} & d_{33} \end{pmatrix} = (d_0 \ d_1 \ d_2 \ d_3) \quad (4)$$

The boundary pixels of the coding block A and the coding block B are respectively expressed as:

$$\begin{pmatrix} a_{03} \\ a_{13} \\ a_{23} \\ a_{33} \end{pmatrix} = D^T \begin{pmatrix} A_{00} & A_{01} & A_{02} & A_{03} \\ A_{10} & A_{11} & A_{12} & A_{13} \\ A_{20} & A_{21} & A_{22} & A_{23} \\ A_{30} & A_{31} & A_{32} & A_{33} \end{pmatrix} d_3 \quad (5)$$

$$\begin{pmatrix} b_{00} \\ b_{10} \\ b_{20} \\ b_{30} \end{pmatrix} = D^T \begin{pmatrix} B_{00} & B_{01} & B_{02} & B_{03} \\ B_{10} & B_{11} & B_{12} & B_{13} \\ B_{20} & B_{21} & B_{22} & B_{23} \\ B_{30} & B_{31} & B_{32} & B_{33} \end{pmatrix} d_0 \quad (6)$$

As the pixel correlation between the boundary pixels of the coding blocks A and the coding block B are large, it is considered that (5) and (6) are equal, so that the following equation between the coefficient data is obtained:

$$\begin{pmatrix} A_{00} & A_{01} & A_{02} & A_{03} \\ A_{10} & A_{11} & A_{12} & A_{13} \\ A_{20} & A_{21} & A_{22} & A_{23} \\ A_{30} & A_{31} & A_{32} & A_{33} \end{pmatrix} d_3 = \begin{pmatrix} B_{00} & B_{01} & B_{02} & B_{03} \\ B_{10} & B_{11} & B_{12} & B_{13} \\ B_{20} & B_{21} & B_{22} & B_{23} \\ B_{30} & B_{31} & B_{32} & B_{33} \end{pmatrix} d_0 \quad (7)$$

As the coefficient data A11 is not correctly reproduced because of the error and other coefficient data are correctly reproduced, the equation (7) is solved with at column vector which includes the coefficient data A11, which gives the following equation:

$$\begin{pmatrix} A_{01} \\ A_{11} \\ A_{21} \\ A_{31} \end{pmatrix} = \frac{1}{d_3}\left(\begin{pmatrix} B_{00} & B_{01} & B_{02} & B_{03} \\ B_{10} & B_{11} & B_{12} & B_{13} \\ B_{20} & B_{21} & B_{22} & B_{23} \\ B_{30} & B_{31} & B_{32} & B_{33} \end{pmatrix} d_0 - \begin{pmatrix} A_{00} & 0 & A_{02} & A_{03} \\ A_{10} & 0 & A_{12} & A_{13} \\ A_{20} & 0 & A_{22} & A_{23} \\ A_{30} & 0 & A_{32} & A_{33} \end{pmatrix} d_3\right) \quad (8)$$

The equation (8) indicates that it is possible to obtain the coefficient data containing the error by utilizing the pixel correlation between the boundary pixels by making the coefficient data containing the error zero. The expression (1) to be used for the error correction is derived from the equation (8) with respect to the coefficient data A11 in which the error occurred.

According to the third embodiment as above, by using the pixel correlation between the boundary pixels of the adjacent coding blocks, stabilized reproducing images can be obtained even when the error has occurred in reproducing.

In the third embodiment the error correction has been made to the coefficient data A11 in which the error has occurred by using the pixel correlation between the boundary pixels with the coding block adjacent to the right. side in the horizontal direction, but the error correction by the similar operation made on a left side in the horizontal direction or between the upper and lower coding blocks is also possible.

Further, it may be possible to obtain the coefficient data A11 lost by the error by using the coding blocks in the four directions as described above, and the error correction can be made with the average value of the coefficient data of the coding blocks in the four directions.

It is more effective that the error correction is made between the boundary pixels having adaptively strong correlation by adopting a most highly correlated coding blocks among the coding blocks in the four directions.

It is needless to say that error corrections of the other coefficient data are also possible by the same error correcting method.

Figure 5:
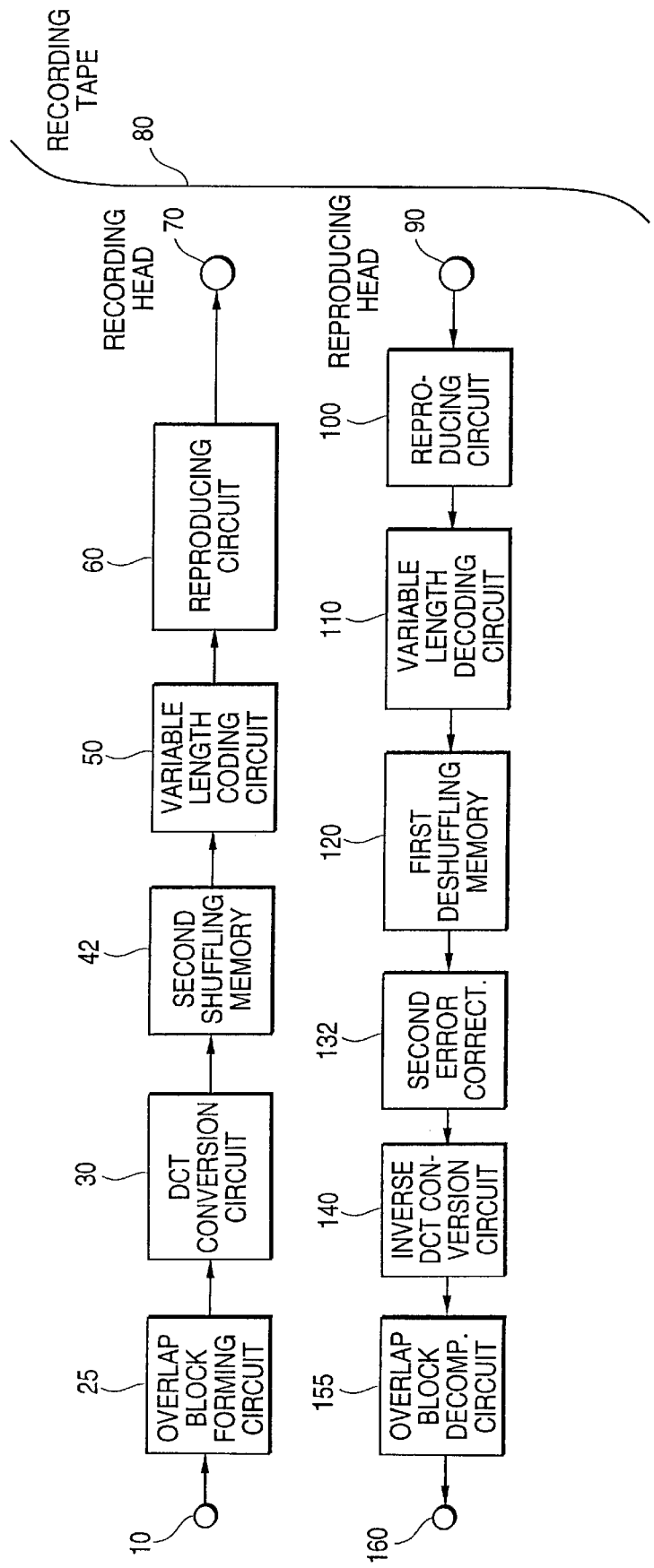
FIG. 5 shows a block diagram of a video image coding, recording and reproducing apparatus in a fourth embodiment of the present invention.

Next, the fourth embodiment of the present invention is explained with reference to the drawings. FIG. 5 shows a block diagram of the video image coding, recording and reproducing apparatus of the fourth embodiment. The same elements as those of the second embodiment are indicated with the same reference numerals as used in the second embodiment and detailed explanation is omitted.

In FIG. 5, reference numeral 25 denotes an overlap block forming circuit, reference numeral 132 denotes a second error correcting circuit, and reference numeral 155 denotes an overlap block decomposing circuit.

With respect to the video image coding, recording and reproducing apparatus constituted as above, its operation is explained below.

Figure 6:
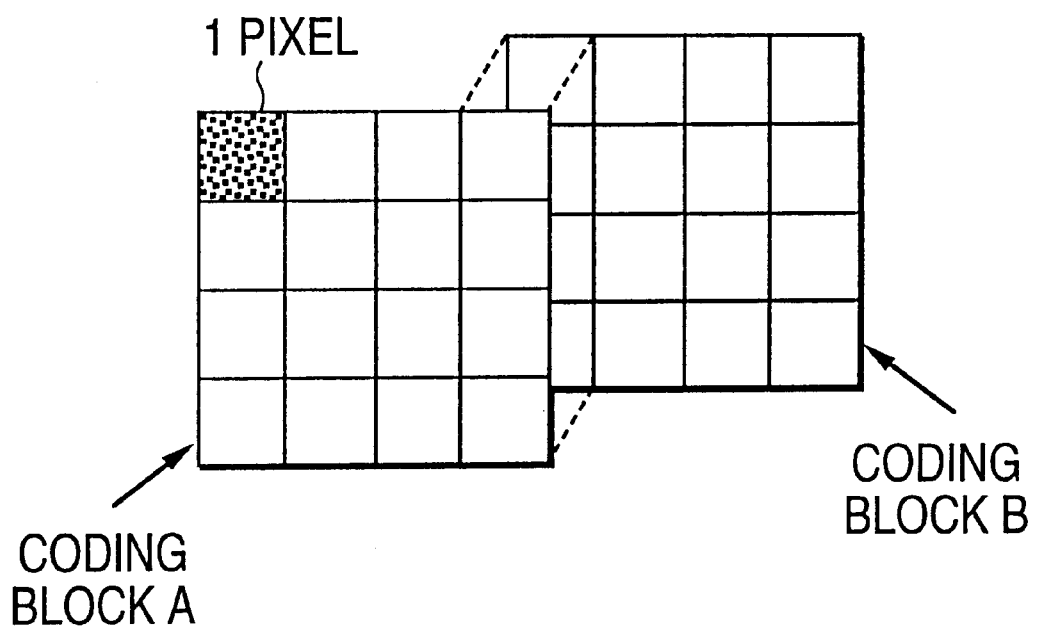
FIG. 6 shows a conceptual diagram showing overlapping coded blocks.

To the input terminal 10, the digital video signal is supplied. The overlap block circuit 25 divides the digital video signal into the coding blocks by overlapping so that the adjacent two 4×4 coding blocks mutually co-possess the one pixel at the boundary on the video screen, as shown in FIG. 6, and supplies the coding block to the DCT conversion circuit 30. The DCT converted coefficient data are subjected to the coefficient shuffling, variable length coding, and recording in the same manner as in the second embodiment and recorded on the recording tape 80.

When reproducing, the reproduced signal from the recording tape 80 is variable length decoded in the same manner as in the second embodiment. The variable length decoding circuit 110 variable length decodes the reproduced variable length coded coefficient data and outputs the decoding error flag showing whether the reproduced variable length coded coefficient data are decoded correctly or not, along with the coefficient data, to the first deshuffling memory 120. The second error correction circuit 132 reads out from the above first deshuffling memory 120 the coefficient data corresponding to the two coded blocks overlapped on the video screen and the decoding error flag corresponding to the coefficient data, carries out error correction, and supplies the error-corrected coefficient data to the inverse DCT conversion circuit 140. The error correction between the overlapped coding blocks in the fourth embodiment is performed under the same operation as in the third embodiment.

The inverse DCT conversion circuit 140 converts the error corrected coefficient data to the pixel data and supplies the pixel data to the overlap block decomposing circuit 155, and the overlap block decomposing circuit 155 converts the pixel data divided into the coding blocks to the digital video signals, and outputs to the output terminal 160.

As described above, according to the fourth embodiment, by dividing the digital video signals into the coding blocks so that the adjacent coding blocks mutually co-possess the one pixel at the boundary on the video screen, it becomes possible to carry out error correction similar to the error correction method as explained in the third embodiment by using the boundary pixel between the adjacent coding blocks which are originally identical pixels, thereby making it possible to realize more correct error correction and to enhance rapidly the stability of the video image coding, recording and reproducing apparatus.

Although in the fourth embodiment no reference is made to the quantizing operation to the coefficient data, in case that the quantizing operation is not performed, it is possible to restore completely the coefficient data lost by the error, and in case that the quantizing operation is performed, some noise may occur in the restored coefficient data attributed to the quantizing noise, but such noise does not provide a significant problem. Although in the fourth embodiment only a case of overlapping in the horizontal direction is described, the present invention is not limited to it. Needless to say, similar effect can be obtained in a case of overlapping in a vertical direction.

Figure 7:
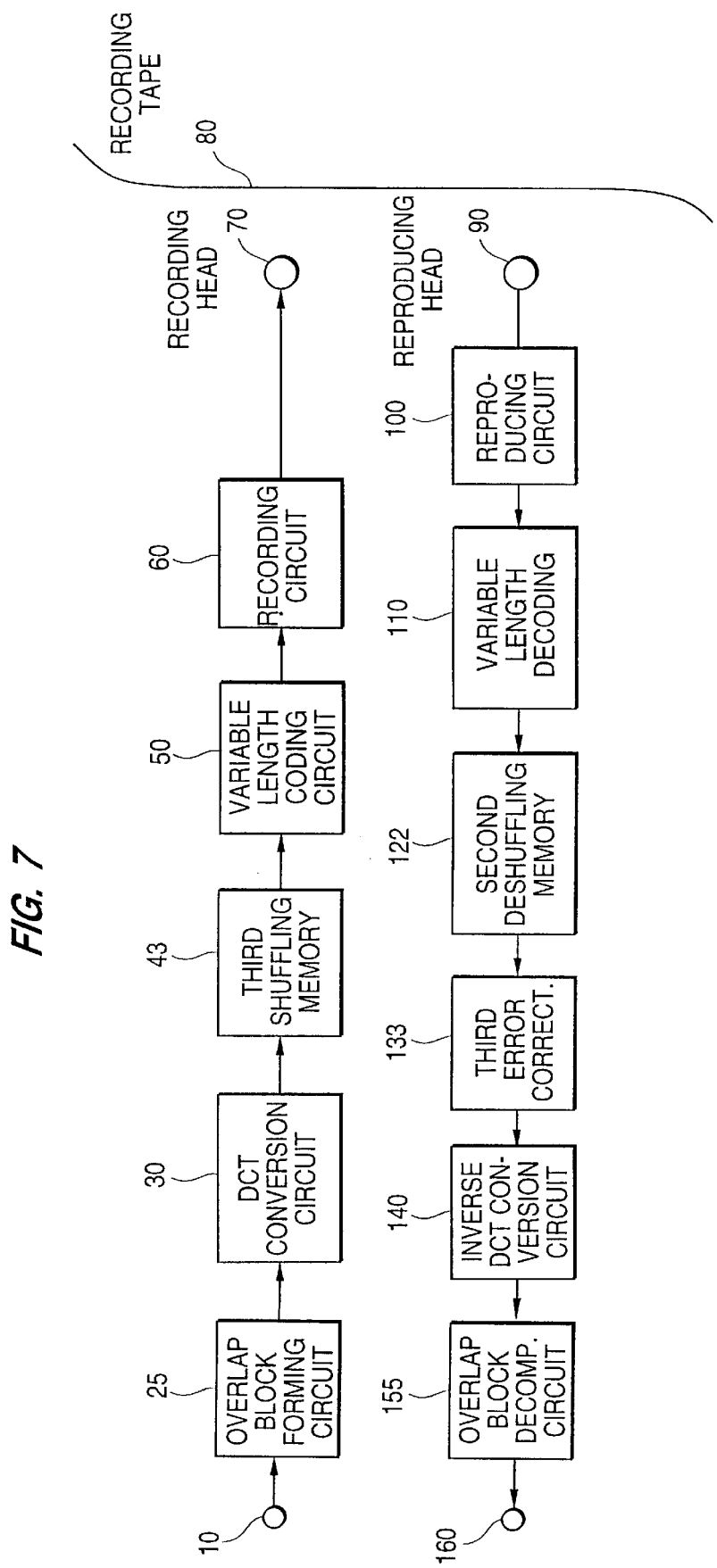
FIG. 7 shows a block diagram of a video image coding, recording and reproducing apparatus in a fifth embodiment of the present invention.

Next, a fifth embodiment of the present invention is described with reference to the drawings. FIG. 7 shows a block diagram of the video image coding, recording and reproducing apparatus of the fifth embodiment. The same elements as those of the second embodiment and the third embodiment are indicated with the same reference numerals as used in the second embodiment and the third embodiment, and detailed explanation is omitted.

In FIG. 7, reference numeral 43 denotes a third shuffling memory, reference numeral 122 denotes a second deshuffling memory, and reference numeral 133 denotes a third error correcting circuit.

With respect to the video image coding, recording and reproducing apparatus constituted as above, its operation is explained below.

Figure 8:
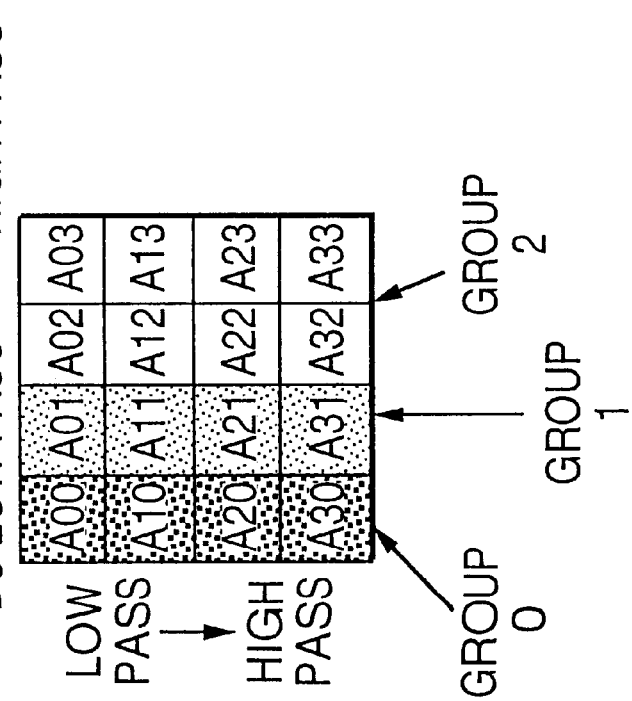
FIG. 8 shows a first conceptual diagram showing divided groups of a coding block.

The digital video signal inputted from the input terminal 10 is divided in the overlap block forming circuit 25 into the coding blocks by overlapping so that the adjacent two 4×4 coding blocks mutually co-possess the one pixel at the boundary on the video screen, as shown in FIG. 6, and the coding blocks are supplied to the DCT conversion circuit 30. The DCT conversion circuit 30 frequency converts each of coding blocks to obtain the coefficient data, and the third shuffling memory 43 stores the coefficient data. The third shuffling memory 43 outputs the coefficient data according to a shuffling rule. The shuffling rule allows that the coefficient data are divided into three groups of a group 0 which includes four coefficient data which are in a lowest region of horizontal frequency components, a group 1 which includes the four coefficient data adjacent to the group 0, and a group 2 which includes 8 coefficient data not included in the group 0 or the group 1, as shown in FIG. 8. Further, the shuffling rule allows that at least six groups in the two overlapped coding blocks are recorded in the distant regions on the recording tape 80.

As described above, the coefficient data are variable length coded in the variable length coding circuit 50, added to the error corrected code and subjected to channel coding in the recording circuit 60, and supplied to the recording head 70 through the recording amplifier. The recording head 70 records the coefficient data on the recording tape 80.

The reproducing head 90 supplies the reproduction output from the recording tape 80 to the reproducing circuit 100. The reproducing circuit 100 demodulates and error corrects the reproducing output, supplies reproduced variable length coded coefficient data and the error correcting error flag showing the result of the error correcting the reproducing output to the variable length decoding circuit 110. The variable length decoding circuit 110 variable length decodes the reproduced variable length coded coefficient data and outputs the decoding error flag showing whether the reproduced variable length coded coefficient data are variable length decoded correctly or not, along with the coefficient data, to the second deshuffling memory 122. The third error correction circuit 133 reads out from the second deshuffling memory 122 the coefficient data in the coding blocks which constitute the same region on the video screen and the decoding error flag corresponding to each of the reproduced variable length coded coefficient data, and corrects the reproduced variable length coded -coefficient data on which the error has been detected. This correction method is basically the same as the correction method explained in the third embodiment. The error occurs in a unit of the group unit comprising a plurality of coefficient data. For example, in the two coding blocks overlapping on the video screen (the coding block A and the coding block B), when the group 0 of the coding block A is lost, the group 0 is obtained by equation (9), and when the group 1 of the coding block A is lost, the group 1 is obtained by equation (8).

$$\begin{pmatrix} A_{00} \\ A_{10} \\ A_{20} \\ A_{30} \end{pmatrix} = \frac{1}{d_3} \left( \begin{pmatrix} B_{00} & B_{01} & B_{02} & B_{03} \\ B_{10} & B_{11} & B_{12} & B_{13} \\ B_{20} & B_{21} & B_{22} & B_{23} \\ B_{30} & B_{31} & B_{32} & B_{33} \end{pmatrix} d_0 - \begin{pmatrix} 0 & A_{01} & A_{02} & A_{03} \\ 0 & A_{11} & A_{12} & A_{13} \\ 0 & A_{21} & A_{22} & A_{23} \\ 0 & A_{31} & A_{32} & A_{33} \end{pmatrix} d_3 \right) \quad (9)$$

A group which is lost can be similarly obtained with respect to the coding block B.

Further, when the group 2 in the coding block A or the coding block B has been lost, the error correction is made with the coefficient data included in the group 2 taken as zeros, because the energy of these coefficient data corresponding to these coefficient data is small and the visual sensitivity to these coefficient data is low, as described in the first embodiment.

Furthermore, since the six groups in the overlapped two coding blocks are recorded in the distant regions from one another on the recording tape 80, there is less possibility for plural groups to become errors simultaneously and be lost, so that the lost coefficient data can be nearly completely error corrected.

As described above, according to the fifth embodiment, the digital video signal is divided into the coding blocks so that the adjacent coding blocks on the video screen mutually co-possess the one pixel at the boundary, the coefficient data in the coding block are divided into groups, the coefficient data in each of groups having the same horizontal frequency components, the six groups included in the overlapped two coding blocks are recorded in the distant regions on the recording tape, and when correcting the error, correction is performed such that the pixels in the overlapped region become equal to each other between the overlapped two coding blocks. Accordingly, it becomes possible to correct the four lost coefficient data simultaneously, thereby making it possible to enhance the stability of the video image coding, recording and reproducing apparatus greatly.

Figure 9:
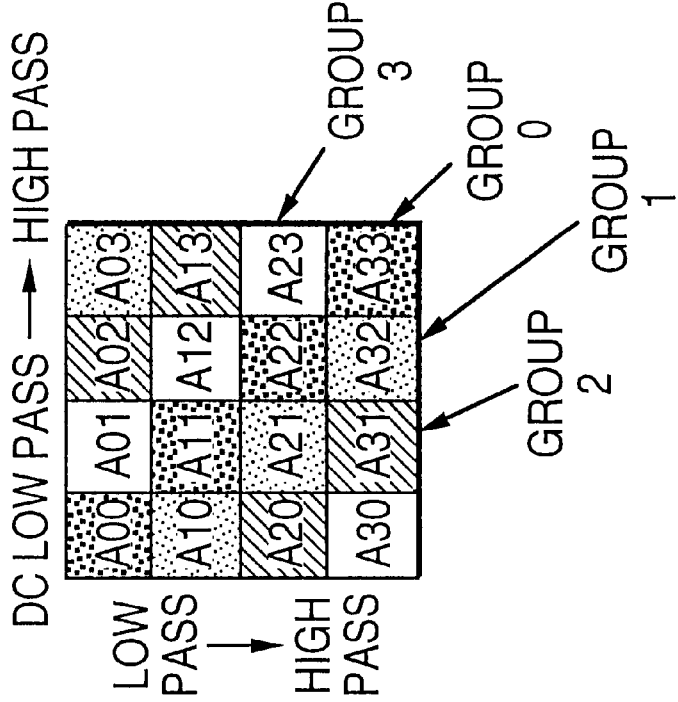
FIG. 9 shows a second conceptual diagram showing divided groups of the coding block.

In the fifth embodiment, in dividing the coding block into the groups, the two coefficient data in the low-band horizontal frequency components are group divided into the groups having the same horizontal frequency components. This group division is one example of a case that the plural coefficient data having no identical vertical frequency component are group divided into the groups. However, the group division as shown in FIG. 9 may be subjected to the error correction by the similar operation.

Also, in this embodiment, the coefficient data in the coding blocks overlapping in the horizontal direction on the video screen are group divided into each coefficient data having no identical vertical frequency component to correct the error in the unit of the group. but similar error correction is possible by such procedure that the coefficient data in the coding blocks overlapping in the vertical direction on the video screen are group divided into the group of the coefficient data having no horizontal frequency component.

Further, in the fifth embodiment, in dividing the coding block into the groups, the coefficient data in the two rows corresponding to high band conversion degree are group divided into one group. This is because of the present intention to prevent lowering of the coding efficiency by variable length coding by using a two dimension Huffman code or the like in the variable length coding circuit and reading out the coefficient data to the high band conversion degree having high possibility of showing continual zeros in the coding block. If, in the variable length coding circuit, in a case of using a one dimension Huffman coding or the like or in a case of a relatively low compression ratio, group division is made by each row and error correction is made against a loss of all the coefficient data, then the reproduction image quality at the occurrence of the error can be made extremely high.

In all embodiments mentioned above, the constitution has been explained on a premise of the recording head and the reproducing head being each single, but the number of each head is not limited to one, but same effect is obtained even in a case of two or more heads. Furthermore, when two or more heads are used, even if any head has been clogged to give failure to obtain a reproducing output, it is possible to carry out error correction effectively and obtain good reproduced video images.

Besides, as a size of the coding block, explanation has been given with an example of 4×4 block, but the size is not limited to it. Similar error correction can be made with any of the size such as 8×8, 8×4, and the like. The frequency conversion is not limited to DCT conversion but Adamar conversion, Stant conversion, Legendre conversion, etc. may be adopted to effect similar error correction.

What is claimed is:

1. A video image coding and recording apparatus comprising:

block forming means for dividing a digital video signal to form a plurality of coding blocks each consisting of a plurality of pixel data;

orthogonal transforming means for orthogonally transforming the pixel data in each of the coding blocks to obtain a plurality of coefficient data blocks each consisting of a plurality of coefficient data orthogonally transformed from the plurality of pixel data contained in a corresponding one of the plurality of coding blocks;

shuffling means for shuffling the coefficient data contained in each of the plurality of coefficient data blocks over at least two of the plurality of coefficient data blocks so that a part of the coefficient data in each of the plurality of coefficient data blocks is replaced by coefficient data contained in another of the plurality of coefficient data blocks to obtain shuffled coefficient data which are arranged in an order which is different from an order of the coefficient data in the form of the plurality of coefficient data blocks; and means for recording the shuffled coefficient data on a recording medium, wherein at least some of the coefficient data contained in each of the plurality of coefficient data blocks are distributed to recording areas which are distant from one another on the recording medium.

2. The apparatus according to claim 1, wherein the shuffling means shuffles the coefficient data such that coded data of coefficient data orthogonally transformed from pixel data contained in two coding blocks which are adjacent to each other on a video screen are recorded in recording areas which are distant from one another on the recording medium.

3. The apparatus according to claim 1, wherein the shuffling means shuffles the coefficient data such that coded data of coefficient data orthogonally transformed from pixel data contained in two coding blocks which belong to different fields from each other and are the same in position on a video screen are recorded in recording areas which are distant from one another on the recording medium.

4. The apparatus according to claim 1, wherein the plurality of coefficient data in each of the plurality of coefficient data blocks are divided into low frequency coefficient data and high frequency coefficient data, and wherein said shuffling means shuffles at least the low frequency coefficient data over at least two of the plurality of coefficient data blocks so that at least the low frequency coefficient data in each of the plurality of coefficient data blocks are distributed to the recording areas which are distant from one another on the recording medium.

5. The apparatus according to claim 1, wherein the block forming means forms the plurality of coding blocks so that two coding blocks which are adjacent to each other on a video screen overlap to contain in common an overlapped part of pixel data at a boundary between the two coding blocks.

6. The apparatus according to claim 1, wherein said shuffling means divides the coefficient data in each of the plurality of coefficient data blocks into a plurality of coefficient data groups, and shuffles the coefficient data over at least two of the plurality of coefficient data blocks on a coefficient data group by coefficient data group basis so that the coefficient data groups in each of the plurality of coefficient data blocks are distributed to the recording areas which are distant from one another on the recording medium.

7. The apparatus according to claim 6, wherein the shuffling means divides the coefficient data in each of the coefficient data blocks into a plurality of coefficient data groups which are different from one another in vertical frequency.

8. The apparatus according to claim 6, wherein the shuffling means divides the coefficient data in each of the coefficient data blocks into a plurality of coefficient data groups which are different from one another in horizontal frequency.

9. The apparatus according to claim 6, wherein the coefficient data in each of the plurality of coefficient data blocks are divided into a part of horizontal low frequency coefficient data and a part of horizontal high frequency coefficient data, and wherein the shuffling means divides the coefficient data in each of the coefficient data blocks into a plurality of coefficient data groups such that the part of horizontal low frequency coefficient data is divided into coefficient data groups which are different from one another in vertical frequency and the part of the horizontal high frequency coefficient data forms a single group.

10. The apparatus according to claim 6, wherein the coefficient data in each of the plurality of coefficient data blocks are divided into a part of vertical low frequency coefficient data and a part of vertical high frequency coefficient data, and wherein the shuffling means divides the coefficient data in each of the coefficient data blocks into a plurality of coefficient data groups such that the part of vertical low frequency coefficient data is divided into coefficient data groups which are different from one another in horizontal frequency and the part of the vertical high frequency coefficient data forms a single group.

11. The apparatus according to claim 6, wherein the shuffling means shuffles the coefficient data such that all of the coefficient data groups of two coefficient data blocks derived from two coding blocks which are adjacent to each other on a video screen are recorded in areas which are distant from one another on the recording medium.

12. The apparatus according to claim 6, wherein the block forming means forms the plurality of coding blocks so that two coding blocks which are adjacent to each other on a video screen overlap to contain in common an overlapped part of pixel data at a boundary between the two coding blocks.

13. A video image coding, recording and reproducing apparatus comprising:

block forming means for dividing a digital video signal to form a plurality of coding blocks each consisting of a plurality of pixel data;

orthogonal transforming means for orthogonally transforming the pixel data in each of the coding blocks to obtain a plurality of coefficient data blocks each consisting of a plurality of coefficient data orthogonally transformed from the plurality of pixel data contained in a corresponding one of the plurality of coding blocks;

shuffling means for shuffling the coefficient data contained in each of the plurality of coefficient data blocks over at least two of the plurality of coefficient data blocks so that a part of the coefficient data in each of the plurality of coefficient data blocks is replaced by coefficient data contained in another of the plurality of coefficient data blocks to obtain shuffled coefficient data which are arranged in an order which is different from an order of the coefficient data in the form of the plurality of coefficient data blocks;

means for recording the shuffled coefficient data on a recording medium, wherein at least some of the coefficient data contained in each of the plurality of coefficient data blocks are distributed to recording areas which are distant from one another on the recording medium;

means for reproducing the recorded shuffled coefficient data from the recording medium to obtain reproduced shuffled coefficient data;

means for detecting an erroneous coefficient data which contains an error among the reproduced coefficient data;

deshuffling means for deshuffling the reproduced shuffled coefficient data to obtain reproduced coefficient data in the form of the plurality of coefficient data blocks;

error correcting means for correcting the erroneous coefficient data by using a reproduced coefficient data which does not contain an error to obtain error corrected coefficient data; and means for inverse orthogonally transforming the reproduced coefficient data including the error corrected coefficient data to obtain a reproduced digital video signal.

14. The apparatus according to claim 13, wherein the error correcting means corrects the erroneous coefficient data by using a reproduced coefficient data which is the same in conversion degree as the erroneous coefficient data and which is contained in a coefficient data block corresponding to a coding block which is adjacent on a video screen to a coding block which corresponds to a coefficient data block containing the erroneous coefficient data.

15. The apparatus according to claim 13, wherein the error correcting means corrects the erroneous coefficient data by using a reproduced coefficient data which is the same in conversion degree as the erroneous coefficient data and which is contained in a coefficient data block corresponding to a coding block which is of a different field from and is the same in position on a video screen to a coding block which corresponds to a coefficient data block containing the erroneous coefficient data.

16. The apparatus according to claim 13, wherein the error correcting means corrects the erroneous coefficient data by using a pixel correlation at a boundary between two coding blocks which are adjacent to each other.

17. The apparatus according to claim 13, wherein the block forming means forms the plurality of coding blocks so that two coding blocks which are adjacent to each other on a video screen overlap to contain in common an overlapped part of pixel data at a boundary between the two coding blocks, and wherein the error correcting means corrects the erroneous coefficient data so that the overlapped part of reproduced pixel data becomes the same in the two coding blocks containing the overlapped part of reproduced pixel data.

18. A video image coding, recording and reproducing apparatus comprising:

block forming means for dividing a digital video signal to form a plurality of coding blocks each consisting of a plurality of pixel data;

orthogonal transforming means for orthogonally transforming the pixel data in each of the coding blocks to obtain a plurality of coefficient data blocks each consisting of a plurality of coefficient data orthogonally transformed from the plurality of pixel data contained in a corresponding one of the plurality of coding blocks;

shuffling means for dividing the coefficient data in each of the plurality of coefficient data blocks into a plurality of coefficient data groups and shuffling the coefficient data contained in each of the plurality of coefficient data blocks over at least two of the plurality of coefficient data blocks on a coefficient data group by coefficient data group basis to obtain shuffled coefficient data in which the coefficient data groups are arranged in an order which is different from an order of the coefficient data groups in the form of the plurality of coefficient data blocks;

means for recording the shuffled coefficient data on a recording medium, wherein at least some of the coefficient data groups in each of the plurality of coefficient data blocks are distributed to recording areas which are distant from one another on the recording medium;

means for reproducing the recorded shuffled coefficient data from the recording medium to obtain reproduced shuffled coefficient data;

means for detecting an erroneous coefficient data which contains an error among the reproduced coefficient data;

deshuffling means for deshuffling the reproduced shuffled coefficient data to obtain reproduced coefficient data in the form of the plurality of coefficient data blocks;

error correcting means for correcting the erroneous coefficient data by using a reproduced coefficient data which does not contain an error to obtain error corrected coefficient data; and means for inverse orthogonally transforming the reproduced coefficient data including the error corrected coefficient data to obtain a reproduced digital video signal.

19. The apparatus according to claim 18, wherein the shuffling means divides the coefficient data in each of the coefficient data blocks into a plurality of coefficient data groups which are different from one another in vertical frequency, and the error correcting means corrects the erroneous coefficient data by using a pixel correlation at a boundary between coding blocks which are adjacent to each other in a horizontal direction on a video screen.

20. The apparatus according to claim 18, wherein the shuffling means divides the coefficient data in each of the coefficient data blocks into a plurality of coefficient data groups which are different from one another in horizontal frequency, and the error correcting means corrects the erroneous coefficient data by using a pixel correlation at a boundary between coding blocks which are adjacent to each other in a vertical direction on a video screen.

21. The apparatus according to claim 18, wherein the coefficient data in each of the plurality of coefficient data blocks are divided into a part of horizontal low frequency coefficient data and a part of horizontal high frequency coefficient data, wherein the shuffling means divides the coefficient data in each of the coefficient data blocks into a plurality of coefficient data groups such that the part of horizontal low frequency coefficient data is divided into coefficient data groups which are different from one another in vertical frequency and the part of the horizontal high frequency coefficient data forms a single group, and wherein the error correcting means corrects the erroneous coefficient data in the horizontal low frequency coefficient data by using a pixel correlation at a boundary between coding blocks which are adjacent to each other in a horizontal direction on a video screen and corrects the erroneous coefficient data in the horizontal high frequency coefficient data to be 0.

22. The apparatus according to claim 18, wherein the coefficient data in each of the plurality of coefficient data blocks are divided into a part of vertical low frequency coefficient data and a part of vertical high frequency coefficient data, wherein the shuffling means divides the coefficient data in each of the coefficient data blocks into a plurality of coefficient data groups such that the part of vertical low frequency coefficient data is divided into coefficient data groups which are different from one another in horizontal frequency and the part of the vertical high frequency coefficient data forms a single group, and wherein the error correcting means corrects the erroneous coefficient data in the vertical low frequency coefficient data by using a pixel correlation at a boundary between coding blocks which are adjacent to each other in a vertical direction on a video screen and corrects the erroneous coefficient data in the vertical high frequency coefficient data to be 0.

23. The apparatus according to claim 18, wherein the shuffling means shuffles the coefficient data such that all of the coefficient data groups of two coefficient data blocks derived from two coding blocks which are adjacent to each other on a video screen are recorded in areas which are distant from one another on the recording medium.

24. The apparatus according to claim 18, wherein the block forming means forms the plurality of coding blocks so that two coding blocks which are adjacent to each other on a video screen overlap to contain in common an overlapped part of pixel data at a boundary between the two coding blocks.

25. A video image coding and recording apparatus comprising:

block forming means for dividing a digital video signal to form a plurality of coding blocks each consisting of a plurality of pixel data;

orthogonal transforming means for orthogonally transforming the pixel data in each of the coding blocks to obtain a plurality of first coefficient data blocks each consisting of a plurality of coefficient data orthogonally transformed from the plurality of pixel data contained in a corresponding one of the plurality of coding blocks;

shuffling means for shuffling the coefficient data to form a plurality of second coefficient data blocks which are different from the plurality of first coefficient data blocks;

means for coding the coefficient data on a second coefficient data block by second coefficient data block basis to obtain coded data; and means for recording the coded data on a recording medium, wherein said shuffling means shuffles the coefficient data contained in each of the plurality of first coefficient data blocks such that each of the plurality of second coefficient data blocks contains a plurality of coefficient data which are derived from at least two of the plurality of first coefficient data blocks such that at least some of the coded data of the coefficient data contained in each of the plurality of first coefficient data blocks are distributed to different recording areas from one another on the recording medium.

26. The apparatus according to claim 25, wherein the shuffling means shuffles the coefficient data such that coded data of coefficient data orthogonally transformed from pixel data contained in two coding blocks which are adjacent to each other on a video screen are recorded in recording areas which are distant from one another on the recording medium.

27. The apparatus according to claim 25, wherein the shuffling means shuffles the coefficient data such that coded data of coefficient data orthogonally transformed from pixel data contained in two coding blocks which belong to different fields from each other and are the same in position on a video screen are recorded in recording areas which are distant from one another on the recording medium.

28. The apparatus according to claim 25, wherein the plurality of coefficient data in each of the plurality of first coefficient data blocks are divided into low frequency coefficient data and high frequency coefficient data, and said shuffling means shuffles at least the low frequency coefficient data such that each of the plurality of second coefficient data blocks contains low frequency coefficient data which are derived from at least two of the plurality of first coefficient data blocks.

29. The apparatus according to claim 25, wherein the block forming means forms the plurality of coding blocks so that two coding blocks which are adjacent to each other on a video screen overlap to contain in common an overlapped part of pixel data at a boundary between the two coding blocks.

30. The apparatus according to claim 25, wherein said shuffling means divides the coefficient data in each of the plurality of first coefficient data blocks into a plurality of coefficient data groups, and shuffles the coefficient data such that each of the plurality of second coefficient data blocks contains coefficient data groups which are derived from at least two of the plurality of first coefficient data blocks.

31. The apparatus according to claim 30, wherein the shuffling means divides the coefficient data in each of the first coefficient data blocks into a plurality of coefficient data groups which are different from one another in vertical frequency.

32. The apparatus according to claim 30, wherein the shuffling means divides the coefficient data in each of the first coefficient data blocks into a plurality of coefficient data groups which are different from one another in horizontal frequency.

33. The apparatus according to claim 30, wherein the coefficient data in each of the plurality of first coefficient data blocks are divided into a part of horizontal low frequency coefficient data and a part of horizontal high frequency coefficient data, and wherein the shuffling means divides the coefficient data in each of the first coefficient data blocks into a plurality of coefficient data groups such that the part of horizontal low frequency coefficient data is divided into coefficient data groups which are different from one another in vertical frequency and the part of the horizontal high frequency coefficient data forms a single group.

34. The apparatus according to claim 30, wherein the coefficient data in each of the plurality of first coefficient data blocks are divided into a part of vertical low frequency coefficient data and a part of vertical high frequency coefficient data, and wherein the shuffling means divides the coefficient data in each of the first coefficient data blocks into a plurality of coefficient data groups such that the part of vertical low frequency coefficient data is divided into coefficient data groups which are different from one another in horizontal frequency and the part of the vertical high frequency coefficient data forms a single group.

35. The apparatus according to claim 30, wherein the shuffling means shuffles the coefficient data such that all of the coefficient data groups of adjacent two of the plurality of first coefficient data blocks are recorded in areas which are distant from one another on the recording medium.

36. The apparatus according to claim 30, wherein the block forming means forms the plurality of coding blocks so that two coding blocks which are adjacent to each other on a video screen overlap to contain in common an overlapped part of pixel data at a boundary between the two coding blocks.

37. A video image coding, recording and reproducing apparatus comprising:
    block forming means for dividing a digital video signal to form a plurality of coding blocks each consisting of a plurality of pixel data;
    orthogonal transforming means for orthogonally transforming the pixel data in each of the coding blocks to obtain a plurality of first coefficient data blocks each consisting of a plurality of coefficient data orthogonally transformed from the plurality of pixel data contained in a corresponding one of the plurality of coding blocks;
    shuffling means for shuffling the coefficient data contained in each of the plurality of first coefficient data blocks to form a plurality of second coefficient data blocks which are different from the plurality of first coefficient data blocks such that each of the plurality of second coefficient data blocks contains a plurality of coefficient data which are derived from at least two of the plurality of first coefficient data blocks;
    means for coding the coefficient data on a second coefficient data block by second coefficient data block basis to obtain coded data;
    means for recording the coded data on a recording medium;
    means for reproducing the recorded coded data from the recording medium to obtain reproduced coded data;
    means for decoding the reproduced coded data to obtain reproduced coefficient data in the form of the plurality of second coefficient data blocks;
    means for detecting an erroneous coefficient data which contains an error among the reproduced coefficient data;
    deshuffling means for deshuffling the reproduced coefficient data to obtain reproduced coefficient data in the form of the plurality of first coefficient data blocks;
    error correcting means for correcting the erroneous coefficient data by using a reproduced coefficient data which does not contain an error to obtain error corrected coefficient data; and
    means for inverse orthogonally transforming the reproduced coefficient data including the error corrected coefficient data to obtain a reproduce d digital video signal.

38. The apparatus according to claim 37, wherein the error correcting means corrects the erroneous coefficient data by using a reproduced coefficient data which is the same in conversion degree as the erroneous coefficient data and which is contained in a first coefficient data block corresponding to a coding block which is adjacent on a video screen to a coding block which corresponds to a first coefficient data block containing the erroneous coefficient data.

39. The apparatus according to claim 37, wherein the error correcting means corrects the erroneous coefficient data by using a reproduced coefficient data which is the same in conversion degree as the erroneous coefficient data and which is contained in a first coefficient data block corresponding to a coding block which is of a different field from and is the same in position on a video screen to a coding block which corresponds to a first coefficient data block containing the erroneous coefficient data.

40. The apparatus according to claim 37, wherein the error correcting means corrects the erroneous coefficient data by using a pixel correlation at a boundary between two coding blocks which are adjacent to each other.

41. The apparatus according to claim 37, wherein the block forming means forms the plurality of coding blocks so that two coding blocks which are adjacent to each other on a video screen overlap to contain in common an overlapped part of pixel data at a boundary between the two coding blocks, and wherein the error correcting means corrects the erroneous coefficient data so that the overlapped part of reproduced pixel data becomes the same in the two coding blocks containing the overlapped part of reproduced pixel data.

42. A video image coding, recording and reproducing apparatus comprising:

block forming means for dividing a digital video signal to form a plurality of coding blocks each consisting of a plurality of pixel data;

orthogonal transforming means for orthogonally transforming the pixel data in each of the coding blocks to obtain a plurality of first coefficient data blocks each consisting of a plurality of coefficient data orthogonally transformed from the plurality of pixel data contained in a corresponding one of the plurality of coding blocks;

shuffling means for dividing the coefficient data in each of the plurality of first coefficient data blocks into a plurality of coefficient data groups and shuffling the coefficient data contained in each of the plurality of first coefficient data blocks to form a plurality of second coefficient data blocks which are different from the plurality of first coefficient data blocks such that each of the plurality of second coefficient data blocks contains coefficient data groups which are derived from at least two of the plurality of first coefficient data blocks;

means for coding the coefficient data on a second coefficient data block by second coefficient data block basis to obtain coded data;

means for recording the coded data on a recording medium;

means for reproducing the recorded coded data from the recording medium to obtain reproduced coded data;

means for decoding the reproduced coded data to obtain reproduced coefficient data in the form of the plurality of second coefficient data blocks;

means for detecting an erroneous coefficient data which contains an error among the reproduced coefficient data;

deshuffling means for deshuffling the reproduced coefficient data to obtain reproduced coefficient data in the form of the plurality of first coefficient data blocks;

error correcting means for correcting the erroneous coefficient data by using a reproduced coefficient data which does not contain an error to obtain error corrected coefficient data; and means for inverse orthogonally transforming the reproduced coefficient data including the error corrected coefficient data to obtain a reproduced digital video signal.

43. The apparatus according to claim 42, wherein the shuffling means divides the coefficient data in each of the first coefficient data blocks into a plurality of coefficient data groups which are different from one another in vertical frequency, and the error correcting means corrects the erroneous coefficient data by using a pixel correlation at a boundary between coding blocks which are adjacent to each other in a horizontal direction on a video screen.

44. The apparatus according to claim 42, wherein the shuffling means divides the coefficient data in each of the first coefficient data blocks into a plurality of coefficient data groups which are different from one another in horizontal frequency, and the error correcting means corrects the erroneous coefficient data by using a pixel correlation at a boundary between coding blocks which are adjacent to each other in a vertical direction on a video screen.

45. The apparatus according to claim 42, wherein the coefficient data in each of the plurality of first coefficient data blocks are divided into a part of horizontal low frequency coefficient data and a part of horizontal high frequency coefficient data, wherein the shuffling means divides the coefficient data in each of the first coefficient data blocks into a plurality of coefficient data groups such that the part of horizontal low frequency coefficient data is divided into coefficient data groups which are different from one another in vertical frequency and the part of the horizontal high frequency coefficient data forms a single group, and wherein the error correcting means corrects the erroneous coefficient data in the horizontal low frequency coefficient data by using a pixel correlation at a boundary between coding blocks which are adjacent to each other in a horizontal direction on a video screen and corrects the erroneous coefficient data in the horizontal high frequency coefficient data to be 0.

46. The apparatus according to claim 42, wherein the coefficient data in each of the plurality of first coefficient data blocks are divided into a part of vertical low frequency coefficient data and a part of vertical high frequency coefficient data, wherein the shuffling means divides the coefficient data in each of the first coefficient data blocks into a plurality of coefficient data groups such that the part of vertical low frequency coefficient data is divided into coefficient data groups which are different from one another in horizontal frequency and the part of the vertical high frequency coefficient data forms a single group, and wherein the error correcting means corrects the erroneous coefficient data in the vertical low frequency coefficient data by using a pixel correlation at a boundary between coding blocks which are adjacent to each other in a vertical direction on a video screen and corrects the erroneous coefficient data in the vertical high frequency coefficient data to be 0.

47. The apparatus according to claim 42, wherein the shuffling means shuffles the coefficient data such that all of the coefficient data groups of adjacent two of the plurality of first coefficient data blocks are recorded in areas which are distant from one another on the recording medium.

48. The apparatus according to claim 42, wherein the block forming means forms the plurality of coding blocks so that two coding blocks which are adjacent to each other on a video screen overlap to contain in common an overlapped part of pixel data at a boundary between the two coding blocks.

* * * * *